Figure 1:
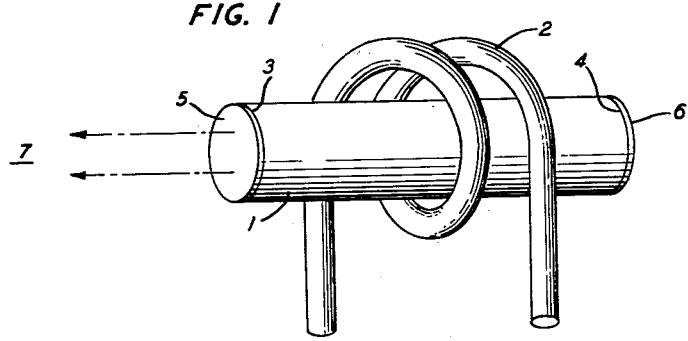

3,152,085
RARE EARTH ORTHOVANADATE OPTICAL
MASER MATERIALS
Albert A. Ballman, Woodbridge, Robert C. Linares, Jr., Madison, and Le Grand G. Van Uitert, Morris Township, Morris County, N.J., assignors to Bell Telephone Laboratories, Incorporated, New York, N.Y., a corporation of New York
Filed Aug. 7, 1961, Ser. No. 129,795
3 Claims. (Cl. 252—301.4)

This invention relates to single crystal vanadate materials exhibiting fluorescent properties and to devices utilizing such crystals.

Recently, considerable interest has developed in a new class of solid state maser devices in which the stimulated frequency is in the optical or near optical spectrum including the infrared and ultraviolet portions of the electromagnetic spectrum. This spectrum encompasses the wavelength range of 100 Angstroms to $2 \times 10^6$ Angstroms. In principle, these devices are directly analogous to the microwave maser, and the mechanics of their operation are well detailed in the literature, for example as described by A. L. Schawlow and C. H. Townes in U.S. Patent 2,929,922, issued March 22, 1960.

Among the more promising forms of optical masers are those which employ a material whose energy level system is characterized by at least three energy levels, with the separation of these levels falling within the desired operating frequency ranges. During operation there is established, at least intermittently, a nonequilibrium electron population distribution in a pair of the selected three energy levels. In particular, the population of the higher of the selected pairs of energy levels is increased to the point at which it is greater than that of the lower level. It is customary to refer to a material in such a state of nonequilibrium as exhibiting a negative temperature.

It is characteristic that if there is applied to a material in a negative temperature state a signal of a frequency which satisfies Planck's law with respect to the two energy levels in nonequilibrium, the applied signal will stimulate the emission of radiation in phase with the signal frequency from the material and the signal will be amplified. In other words, the active maser material is chosen such that the two energy levels are separated by an energy equal to $h\mu$, where $h$ is Planck's constant and $\mu$ is equal to the frequency to be amplified. This separation is less than the separation between the top and bottom levels of the selected three-level energy system.

The negative temperature state is established by applying to the material pump energy of a frequency of at least the frequency corresponding to the separation between the top and bottom levels of the selected three-level energy system. The application of sufficient pump energy effects electron transitions from the bottom level to the top level and the populations of the bottom and top levels are thereby made to approach equality. Under these conditions there will be a negative temperature either between the top and middle levels or between the middle and bottom levels. Since a competing process known as "relaxation" tends to return the system to equilibrium, thereby destroying the negative temperature state, pump energy is applied to the material during the period of signal amplification.

Among the more promising active maser materials are those which comprise a host crystal containing paramagnetic ions from which the stimulated emission occurs. The host crystal of a material meeting the above-described requirements must be capable of accepting the paramagnetic ions in such a way that they are able on excitation to fluoresce with good over-all quantum efficiency, with as much of the emitted energy as possible concentrated in a single line. To maximize amplification of the signal frequency, the emission line preferably corresponds to a transition to a state other than the ground state such that the single bright emission line is narrow in width.

Since the pump sources typically utilized in optical masers generally exhibit an energy output over a broad frequency spectrum, it is desirable that the paramagnetic ions possess a broad absorption spectrum to facilitate establishment of the negative temperature state. Desirably, the paramagnetic ions also exhibit a relaxation time sufficiently long so that the quantum efficiency for fluorescence is close to unity. Otherwise, the magnitude of the pumping frequency would have to be greatly increased in order to maintain a negative temperature state wherein sufficient electrons are available in the higher energy level to amplify the input frequency. To ensure a narrow emission line, the energy level widths of the pair of spaced energy levels in the negative temperature state are preferably narrow.

In view of the above-detailed requirements, very few optical maser materials are known to the art. Most published work on optical masers is directed to ruby crystals and calcium fluoride crystals containing small amounts of uranium (III) and samarium (II). Ruby crystals, however, suffer the disadvantage of requiring high pumping power to establish a negative temperature state. As such, under the usual conditions ruby masers are limited in operation to producing a pulsed beam of coherent light.

As previously discussed, there should be a correspondence between the signal to be amplified and the energy level separations of the maser material. Therefore, it is desirable that new maser materials having a range of energy level separations and fulfilling the above-detailed requirements be developed so that a range of signal frequencies can be amplified.

In accordance with the present invention, a new fluorescent composition of matter suitable for use in optical maser devices has been developed. The host lattices of the composition are of the zircon structure and are lutetium vanadate, gadolinium vanadate, and yttrium vanadate, in which restricted amounts of the lutetium, gadolinium, and yttrium atoms have been replaced with dysprosium or europium in the 3+ valency state. The composition has the empirical formula

$$A_{1-x}B_xVO_4$$

where A is an ion selected from the group consisting of lutetium, gadolinium, and yttrium, B is a trivalent rare-earth ion selected from the group consisting of dysprosium and europium, and $x$ has a value of from 0.00001 to 0.25. The subscripts in the above formula signify the relative number of gram atoms of the element indicated which are present and thus are also proportional to the relative number of atoms of each element present in the composition.

The materials of the instant invention emit energy of narrow line width. For example, the 6185 Angstrom line width associated with the europium-containing compositions of the invention ranges from approximately 0.7 cm.$^{-1}$ at low europium concentrations to 3.0 cm.$^{-1}$ for high europium concentrations at liquid nitrogen temperature. The 5750 Angstrom line width associated with the dysprosium-containing compositions of the invention ranges from approximately 1.5 cm.$^{-1}$ for low dysprosium concentrations to 2.0 cm.$^{-1}$ for high dysprosium concentrations at liquid nitrogen temperature. The excited electrons evidence a relaxation time sufficiently long so that the quantum efficiency for fluorescence is close to unity. Since the electrons possess at least three energy levels and electron transitions are to other than the ground state, the establishment of a continuous negative temperature state is feasible and the material is capable of fluorescing in a continuous beam of coherent light.

Figure 2:
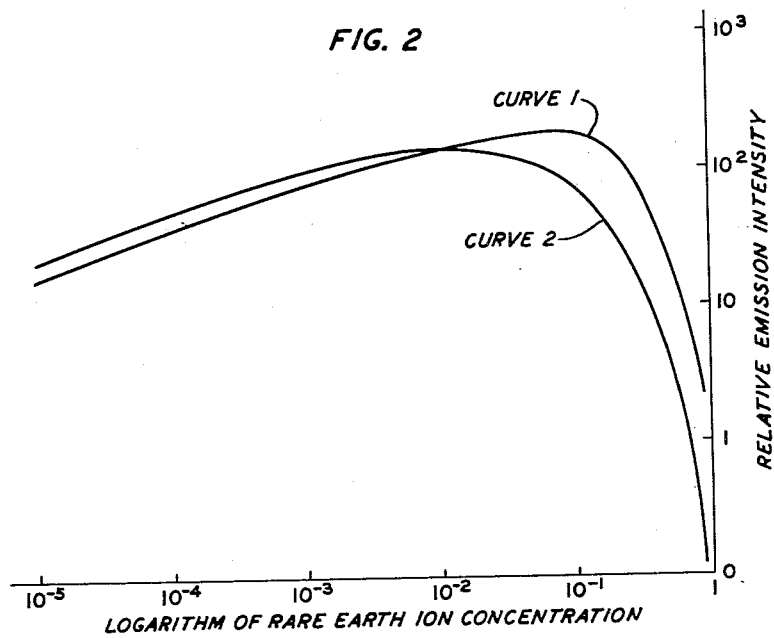

The invention may be more easily understood by reference to the drawing, in which:

FIG. 1 is a front elevational view of an apparatus embodying the material of the invention; and FIG. 2, on coordinates of relative emission intensity and gram atoms per formula of trivalent europium ion, is a semi-log plot showing the dependency of the emission intensity on the concentration of rare-earth ion in the material of the invention.

Referring more particularly to FIG. 1, there is shown a rod-shaped crystal 1 having the composition as disclosed herein. Pumping energy is supplied by means of helical lamp 2 encompassing rod 1 and connected to an energy source not shown. Lamp 2 is an ultraviolet lamp having a compact arc of high pressure mercury. Ends 3 and 4 of rod 1 are ground and polished so as to be optically flat and parallel and are silvered so as to provide reflective layers 5 and 6. As indicated, layer 6 is completely reflecting, while layer 5 is only partially reflecting, so permitting the escape of coherent radiation 7 of a wavelength of approximately 6185 Angstroms for the europium-containing compositions and 5750 Angstroms for the dysprosium-containing compositions of the invention. Rod 1 during operation is preferably maintained in an atmosphere of liquid nitrogen (at a temperature of approximately 79 degrees Kelvin) so as to more readily attain a negative temperature state.

The spectrum of the pump source including ultraviolet light is desirably within the range of 2000 Angstroms to 4200 Angstroms. Although higher frequencies are suitable, sources of such frequencies are not generally available. It has been found that an ultraviolet source having an emission peak of about 2537 Angstroms is advantageously utilized for the present purposes.

Although the expressed range is the range of energy most effective, it is not necessary to use a source having an output restricted to this range. For example, a gaseous discharge flash bulb, although emitting white light, nevertheless emits a large amount of energy in the desired spectrum.

Device discussion has been largely in terms of the most commonly reported maser design. Although such a device is easily fabricated, other configurations have been disclosed in the literature and may prove advantageous. All such variations are considered to be within the scope of the invention.

The effect of rare-earth ion concentration on the emission intensity of the material of the invention is shown in FIG. 2. In this figure the ordinate measures the relative emission intensity of several vanadate compositions containing added europium or dysprosium, with the abscissa indicating the logarithm of the europium and dysprosium content of these compositions. Curve 1 of this figure shows the effect of europium inclusions in one composition of the invention having the empirical formula $Y_{1-x}Eu_xVO_4$. Curve 2 of this figure shows the effect of dysprosium inclusions in another composition of the invention having the empirical formula $$Y_{1-x}Dy_xVO_4$$

It has been found that lutetium and gadolinium give results comparable to yttrium in the compositions of the invention.

Based on FIG. 2, inclusions of 0.00001 to 0.25 gram atom per formula of trivalent rare-earth ion in the vanadate host crystal result in a material exhibiting an enhanced emission intensity. The lower limit of 0.00001 gram atom is based on the necessity of having sufficient unpaired electrons available in the negative temperature state to adequately amplify the input signal. As seen from FIG. 2, smaller rare-earth ion inclusions result in a decrease in the emission intensity exhibited by the materials of the invention. The upper limit of 0.25 gram atom is governed by maser operation and efficiency.

Beyond this limit, interaction between rare-earth ions results in a decrease in amplification. As seen from the figure, increasing amounts of rare-earth ion inclusions above the minimum limit of 0.00001 causes the emission intensity to pass through a maximum and then decrease.

Based on the preceding considerations, a preferred rare-earth ion inclusion range is 0.0001 to 0.10 gram atom per formula, with an optimum range being 0.001 to 0.05 gram atom per formula.

To obtain curves 1 and 2 of FIG. 2, measurements were made on various materials of the invention with a Gaertner high dispersion spectrometer adapted with an Aminco photomultiplier using a 1P22 tube. Ten micron slit widths were employed at the entrance and exit to the spectrometer. The system was calibrated against a tungsten filament lamp whose output was assumed to have a black body dependence to give relative values of brightness of the emitting surface in units of power per unit wavelength range. Emission was excited by illuminating a sample one inch long by one-half inch wide by one-quarter inch deep with a 2537 Angstrom mineralight through a Corning 9863 filter. The measurements on the vanadate crystals of the instant invention were made at room temperature. The intensities are relative to 100 for the 5450 Angstrom peak of a comparable sample of $Na_{0.5}Tb_{0.5}WO_4$.

It has been determined that replacing europium and dysprosium with other rare-earth ions in the vanadate compositions of the invention results in either a non-fluorescent or weakly fluorescent material. For example, substitution of terbium results in a nonfluorescent material, while the substitution of thulium, holmium, and other rare-earth ions results in only a weakly fluorescent material. It has been further determined that replacing yttrium, lutetium, or gadolinium in the compositions of the invention with lanthanum results in a weakly fluorescent material.

As evidenced by curve 1 of FIG. 2, the europium-containing vanadate compositions of the invention exhibit a maximum emission intensity approximately 100 times brighter than the intensity of the europium vanadate end component. Additionally, whereas the maximum line width of the europium-containing compositions of the invention is of the order of 3 cm.$^{-1}$, the line width of europium vanadate itself is in the order of 5 to 6 cm.$^{-1}$.

As evidenced by curve 2 of FIG. 2, the dysprosium-containing vanadate compositions of the invention exhibit a maximum emission intensity approximately 1,000 times brighter than the intensity of the dysprosium vanadate end component. Additionally, whereas the maximum line width of the dysprosium-containing compositions of the invention is in the order of 2 cm.$^{-1}$, the line width of dysprosium vanadate itself is approximately 5 to 6 cm.$^{-1}$.

The vanadate crystals of the invention are advantageously grown in a sodium metavanadate or sodium orthovanadate flux or mixtures thereof. Briefly, a mixture of the desired vanadate and an europium or dysprosium-containing composition is heated in the flux to a temperature sufficient to form a molten solution. The molten solution is then slowly cooled until it solidifies. In the course of cooling, crystals of the vanadate containing europium or dysprosium ions are formed in the flux.

The initial mixture is equivalent to 10 mol parts to 75 mol parts of the vanadate and 90 mol parts to 25 mol parts of the flux. One advantage of the flux is its solvent power which permits temperatures of approximately 700 degrees centigrade to 1350 degrees centigrade to be used in forming a molten solution of the initial mixture. These temperatures avoid reduction of the europium and dysprosium ions to lower undesirable valency states which are not suitable for optical maser use.

There is no critical limit to particle size of the initial ingredients since a molten solution is formed of the initial mixture. However, it is desirable to minimize the amount of accidentally added rare-earth ion impurity in order to ensure consistent results. For example, the presence of a fraction of a percent of terbium is sufficient to quench the fluorescence of other rare-earth ions in the vanadates. Typically, however, rare-earth ion impurities are generally tolerated in the compositions of the invention in amounts up to one percent of the principal active rare-earth ion intentionally added. To minimize such contamination, spectroscopically pure rare-earth ion substances such as oxides are typically utilized in the initial mixture. Generally, the nonactive ion impurity limits are not critical and ordinary reagent-grade vanadates or substances that reaction to form the vanadates are utilized.

The atmosphere in which the initial mixture is heated is not critical. However, it is well known to use an oxide-containing atmosphere such as air, oxygen, or oxygen and an inert gas to prevent an ion in a higher valency state from being reduced to a lower valency state. Similarly, for convenience, atmospheric pressure is normally used, although pressure is not critical. As is well known, increased pressures in general enhance solubility of the solute, thereby permitting lower temperatures to be used.

After the heating step, the molten solution is cooled at a controlled rate of 0.1 degree centigrade per hour to 25 degrees centigrade per hour in the same atmosphere used in the heating step until it solidifies, forming vanadate crystals having europium or dysprosium ions dispersed therein. The solidification point is readily determined visually. For most of the molten solutions, cooling to a temperature of 650 degrees centigrade to 850 degrees centigrade is adequate to cause solidification.

The vanadate crystals in the flux are then furnace cooled or quenched to room temperature. The flux is removed from the crystals by washing the crystals with hot water.

Specific examples of procedures utilized in preparation of compositions of the invention are given below. In all cases the properties of the resulting compositions were measured as previously described and measurements plotted in accordance with the description in conjunction with FIG. 2. These examples are to be construed as illustrative only and not as limiting in any way the scope and spirit of invention.

*Example 1*

11.5 grams $Y_2O_3$, 29.6 grams $V_2O_5$, 24.9 grams $Na_2CO_3$, and 0.18 gram $Eu_2O_3$ were dry mixed together. The mixture was then heated in a platinum crucible in air for four hours at a temperature of 1180 degrees centigrade. The molten solution formed was then cooled in air at a controlled rate of 2 degrees centigrate per hour to a temperature of 800 degrees centigrade. The resulting solids were then furnace cooled to room temperature and washed with hot water, leaving yttrium vanadate crystals doped with trivalent europium. The formed crystals had the following composition:

$$Y_{0.99}Eu_{0.01}VO_4$$

*Example 2*

11.5 grams $Y_2O_3$, 0.18 gram $Dy_2O_3$, 29.6 grams $V_2O_5$ and 24.9 grams $Na_2CO_3$ were dry mixed. The mixture then underwent the same processing as detailed above with the resulting formation of yttrium vanadate crystals doped with trivalent dysprosium. The formed crystals had the following composition:

$$Y_{0.99}Dy_{0.01}VO_4$$

*Example 3*

20.0 grams $Lu_2O_3$, 0.18 gram $Eu_2O_3$, 29.6 grams $V_2O_5$ and 24.9 grams $Na_2CO_3$ were dry mixed. The mixture then underwent the same processing as detailed above with the resulting formation of lutetium vanadate crystals doped with trivalent europium. The formed crystals had the following composition:

$$Lu_{0.99}Eu_{0.01}VO_4$$

*Example 4*

20.0 grams $Lu_2O_3$, 0.18 gram $Dy_2O_3$, 29.6 grams $V_2O_5$ and 16.6 grams $Na_2CO_3$ were dry mixed. The mixture then underwent the same processing as detailed above with the resulting formation of lutetium vanadate crystals doped with trivalent dysprosium. The formed crystals had the following composition:

$$Lu_{0.99}Dy_{0.01}VO_4$$

*Example 5*

18.4 grams $Gd_2O_3$, 0.18 gram $Dy_2O_3$, 29.6 grams $V_2O_5$ and 16.6 grams $Na_2CO_3$ were dry mixed. The mixture then underwent the same processing as detailed above with the resulting formation of gadolinium vanadate crystals doped with trivalent dysprosium. The formed crystals had the following composition:

$$Gd_{0.99}Dy_{0.01}VO_4$$

*Example 6*

18.4 grams $Gd_2O_3$, 0.18 gram $Eu_2O_3$, 29.6 grams $V_2O_5$ and 24.9 grams $Na_2CO_3$ were dry mixed. The mixture then underwent the same processing as detailed above with the resulting formation of gadolinium vanadate crystals doped with trivalent europium. The formed crystals had the following composition:

$$Gd_{0.99}Eu_{0.01}VO_4$$

What is claimed is:

1. A composition of matter consisting essentially of a single crystal vanadate material having the empirical formula:

$$A_{1-x}B_xVO_4$$

where A is an ion selected from the group consisting of lutetium, gadolinium and yttrium, B is a trivalent rare-earth ion selected from the group consisting of europium and dysprosium, and $x$ has a value of from 0.00001 to 0.25.

2. A composition of matter in accordance with claim 1 wherein $x$ has a value of from 0.0001 to 0.1.

3. A composition of matter in accordance with claim 1 wherein $x$ has a value of from 0.001 to 0.05.

References Cited in the file of this patent

UNITED STATES PATENTS 2,929,922    Schawlow _____ Mar. 22, 1960

OTHER REFERENCES

Kroger: Some Aspects of the Luminescence of Solids, Elsevier Pub. Co., New York, 1948, page 285.